United States Patent [19]

Hodgson, Jr. et al.

[11] 4,422,512

[45] Dec. 27, 1983

[54] NARROW-BASE TERRACING PLOW

[75] Inventors: Emory R. Hodgson, Jr., Yazoo City, Miss.; Darryl C. Rester, Baton Rouge, La.

[73] Assignee: Dynamics Corporation of America, Greenwich, Conn.

[21] Appl. No.: 269,521

[22] Filed: Jun. 1, 1981

[51] Int. Cl.³ .............................................. E02F 5/22
[52] U.S. Cl. ................................. 172/454; 172/700; 172/583
[58] Field of Search ............... 172/572, 459, 460, 582, 172/701, 445.2, 430, 583, 600

[56] References Cited

U.S. PATENT DOCUMENTS

| | | | |
|---|---|---|---|
| 2,589,896 | 3/1952 | Toland | 172/430 X |
| 2,804,294 | 8/1957 | Meagher | 262/20 |
| 2,838,987 | 6/1958 | Burton | 97/47.63 |
| 3,088,527 | 5/1963 | Burch | 172/579 |
| 3,209,840 | 10/1965 | Lehman | 172/584 |
| 3,265,137 | 8/1966 | Couser | 172/307 |
| 3,275,087 | 9/1966 | Petitt | 172/572 |
| 3,576,215 | 4/1971 | Cline | 172/445.2 |
| 4,223,743 | 9/1980 | Garrison | 172/583 |

OTHER PUBLICATIONS

Athens Series "160" Tool Bar Levee Harrow.
Blaton "Levee Master" Dyke Plow Model No. 700.
Dell Model 1200 Levee Devil Levee Disc.
Midland R 808 Levee Plow.
Rome 3 Point Lift Rice Levee Harrow Series TPW.
Rayne Plane Levee & Terracing Plows.
Delta King Levee Disk Plow.
W & A Levee Plow.
Forrest City Hydraulically Operated Levee Plow.

Primary Examiner—Richard J. Johnson
Attorney, Agent, or Firm—Schroeder, Siegfried, Vidas & Arrett

[57] ABSTRACT

A narrow-base terracing plow comprising a tractor-borne transverse frame supporting a pair of transversely spaced rearwardly and outwardly extending gangs of inwardly directed disc harrows, each gang being pivotally mounted on a mounting bracket for vertical swinging movement relative thereto and the mounting bracket being mounted on said frame for swinging movement about a vertical axis, each gang having a rigid link pivotally connected thereto and to the frame and having a hydraulic cylinder extending between its mounting bracket and the medial portions of the gang by means of which the outer end portion of the gang can be forced downwardly into the soil to a greater extent than its innermore portions, thereby causing the soil through which it passes to be moved laterally toward the centerline until a terrace is formed between the gangs and peaks thereat. Novel methods of utilizing the plow are also disclosed in which by forcing the outer end portions downwardly during the repeated passes, it will move the earth centrally and thereby form such a terrace.

17 Claims, 12 Drawing Figures

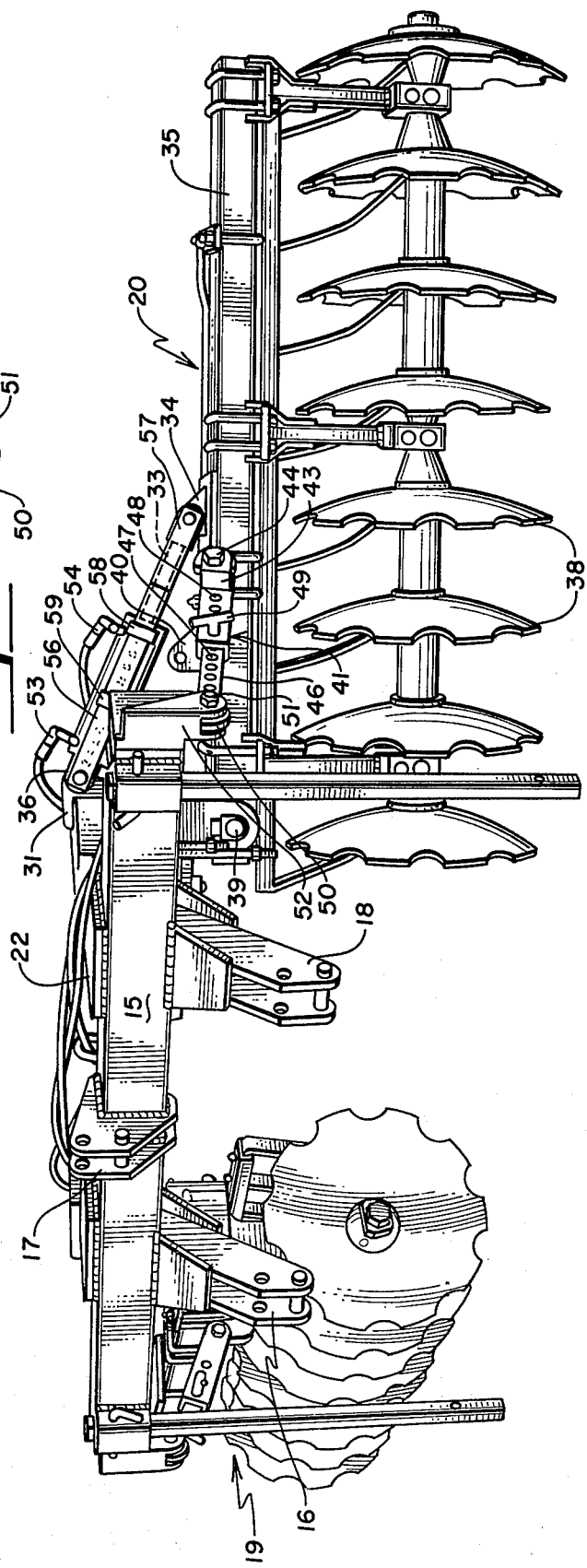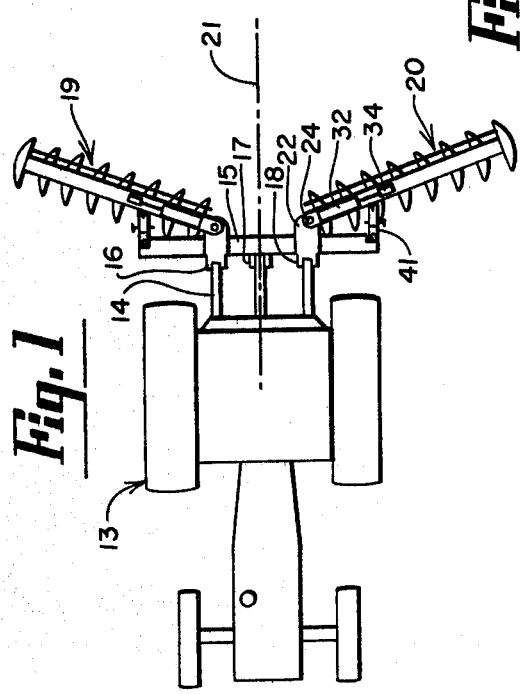

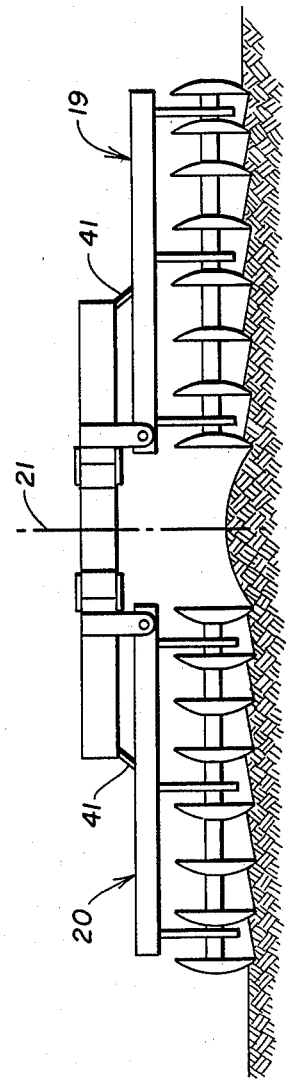
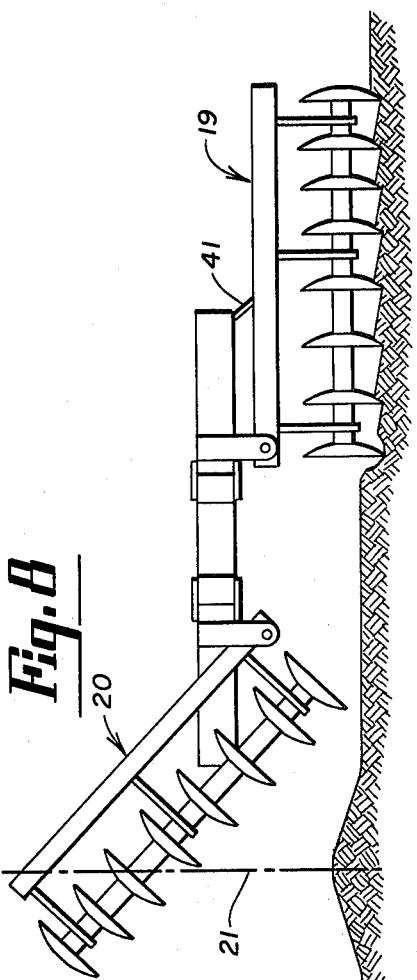
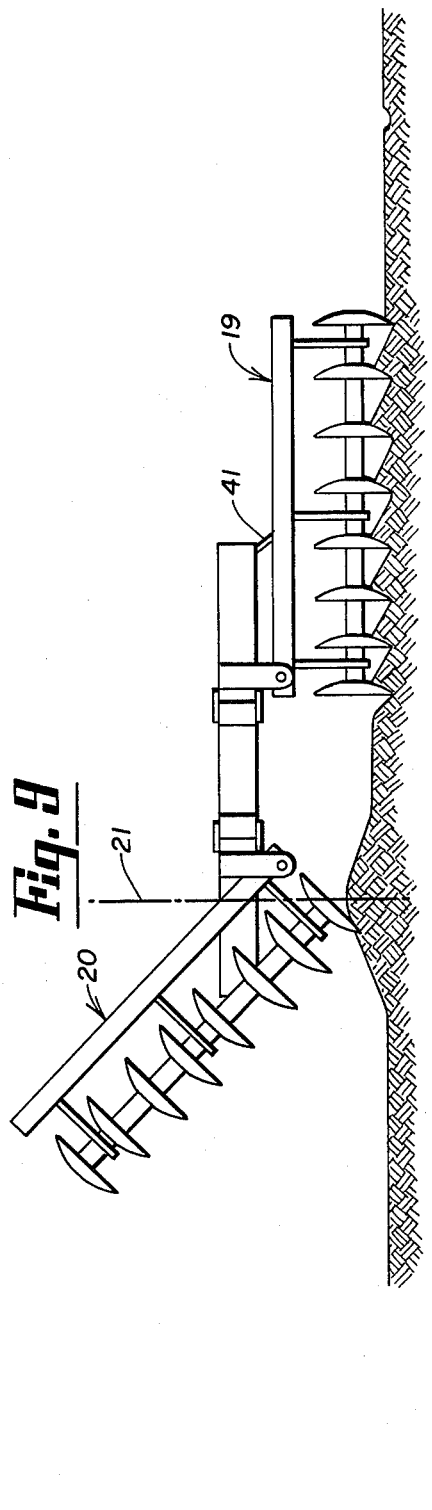

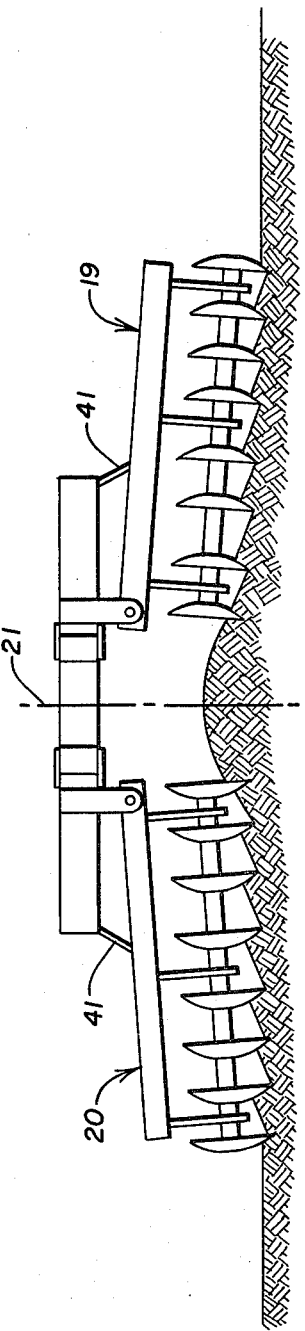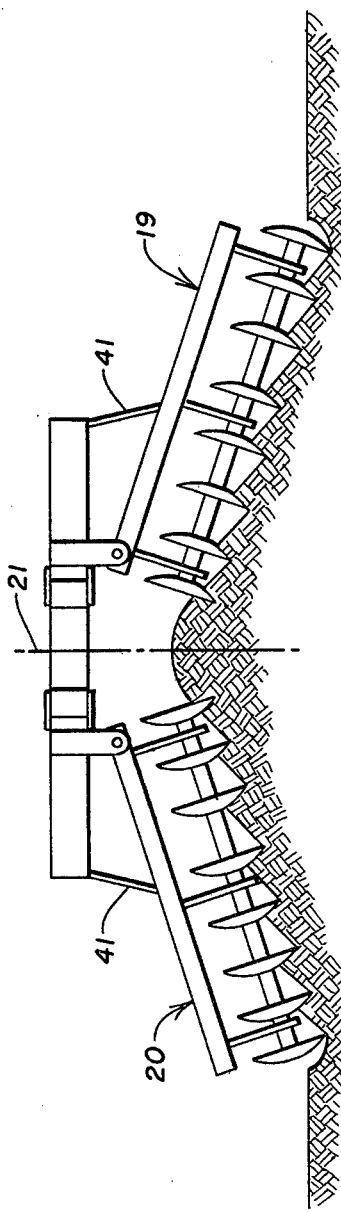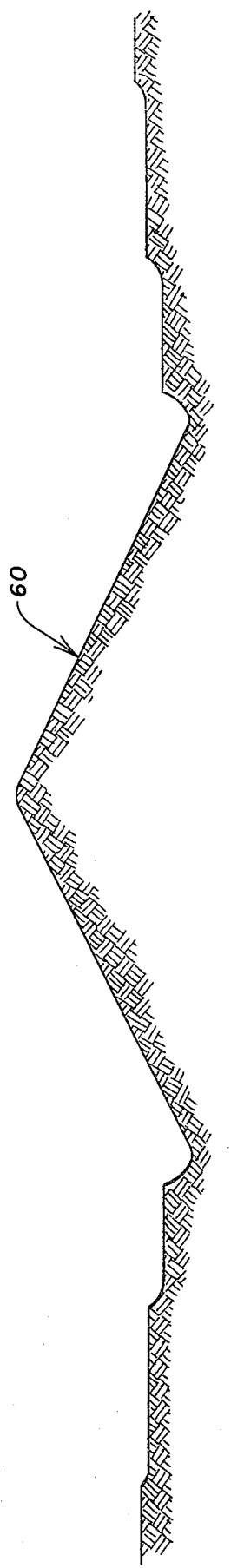

NARROW-BASE TERRACING PLOW

DESCRIPTION

BACKGROUND OF THE PRIOR ART

The requirements of the Soil Conservation Service of the United States for narrow-base terraces vary somewhat, depending upon field conditions and climate. Terrace height (after settling) is measured from the bottom of the channel to the top of the terrace ridge and will vary, depending on conditions, with land slope being the major factor. Narrow-base terraces generally have a width at their base approximately 13–15 feet and a height approximating 2–3 feet. Such terraces have conventionally been constructed with bull-dozers which makes their construction relatively costly, and in some cases, almost prohibitive, because of the capital investment in the equipment, the relatively high expense of operating same, and the amount of time required to complete a given project. Our invention is directed toward reducing both the time and expenses heretofore required for building such narrow-base terraces.

BRIEF SUMMARY OF THE INVENTION

The invention comprises new methods and apparatus for forming narrow-base terraces in which a pair of transversely spaced centrally directed disc harrows gangs are mounted upon a transverse frame which is carried by a tractor. Each of the gangs is pivotally mounted upon the lower portions of a mounting bracket for vertical swinging movement relative thereto and each bracket is mounted upon the frame for pivotal movement about a vertical axis. Each gang extends rearwardly and outwardly from its supporting mounting bracket and is additionally connected to the frame by a rigid link which is universally connected to the frame at one of its ends and to the intermediate portions of the gang at its other end. The salient feature of the machine is a hydraulic piston and cylinder assembly which is pivotally mounted at its upper end upon the upper portions of said mounting bracket and is pivotally connected to the intermediate portions of the gang at its lower end whereby the outer end portions of each gang may be forcibly depressed so that the outer discs will penetrate the soil more deeply than the innermore discs and the soil will be moved centrally to a marked degree to cause a terrace to be formed along the centerline between the gangs.

To produce a narrow-base terrace of ample height, we thereafter utilize only one of the gangs to move additional soil laterally into the path of the earlier passes of the gangs. We accomplish this by elevating one gang and moving the other through the soil just outside its earlier path, so as to move the soil engaged thereby laterally toward the centerline of the terrace. In so doing, the tractor wheels pack the soil of the terrace along the sides of the centerline. Repeated passes with the same gang along lines parallel to the centerline and progressively closer to the centerline causes such soil to be moved laterally into the original path of the gangs in their first pass along the centerline. Movement of the soil is expedited by forcibly depressing the outer end portions into the soil to a greater extent than the innermore portions. After the soil has been moved laterally, as described above, into the original path of the gangs, repeated passes with both gangs lowered are made and the outer end portions are increasingly forcibly depressed with each pass until the gang is oriented at approximately 18° off horizontal at which point the terrace will peak.

BRIEF DESCRIPTION OF THE DRAWINGS

A detailed description of one preferred embodiment of the NARROW-BASE TERRACING PLOW is hereafter described with specific reference being made to the drawings, in which:

FIG. 1 is a top plan view of the preferred embodiment of our invention shown in simplified form;

FIG. 2 is a perspective view of the disc harrow assembly of my invention, shown at rest and disconnected from the tractor, with support standards provided;

FIG. 3 is a perspective view on an enlarged scale of the adjustable link universally connecting one disc harrow frame to the main transverse frame;

FIG. 7 is a diagrammatic rear elevational view illustrating the first step in forming a narrow base terrace with our new terracing plow;

FIG. 8 is a diagrammatic rear elevational view illustrating a following step which may be utilized in practicing our invention;

FIG. 9 is a diagrammatic rear elevational view illustrating a step subsequent to that shown in FIG. 8, which may be utilized in practicing our invention;

FIG. 10 is a diagrammatic rear elevational view of a step subsequent to that shown in FIG. 9 which may be utilized in practicing our invention;

FIG. 11 is a diagrammatic rear elevational view of a final step which may be utilized in practicing our invention; and FIG. 12 is a diagrammatic view of the narrow base terrace and the surface of the adjoining areas after the terrace has been formed by practicing our invention in accordance with the steps shown in FIGS. 7–11.

DETAILED DESCRIPTION OF THE INVENTION

Figure 4:
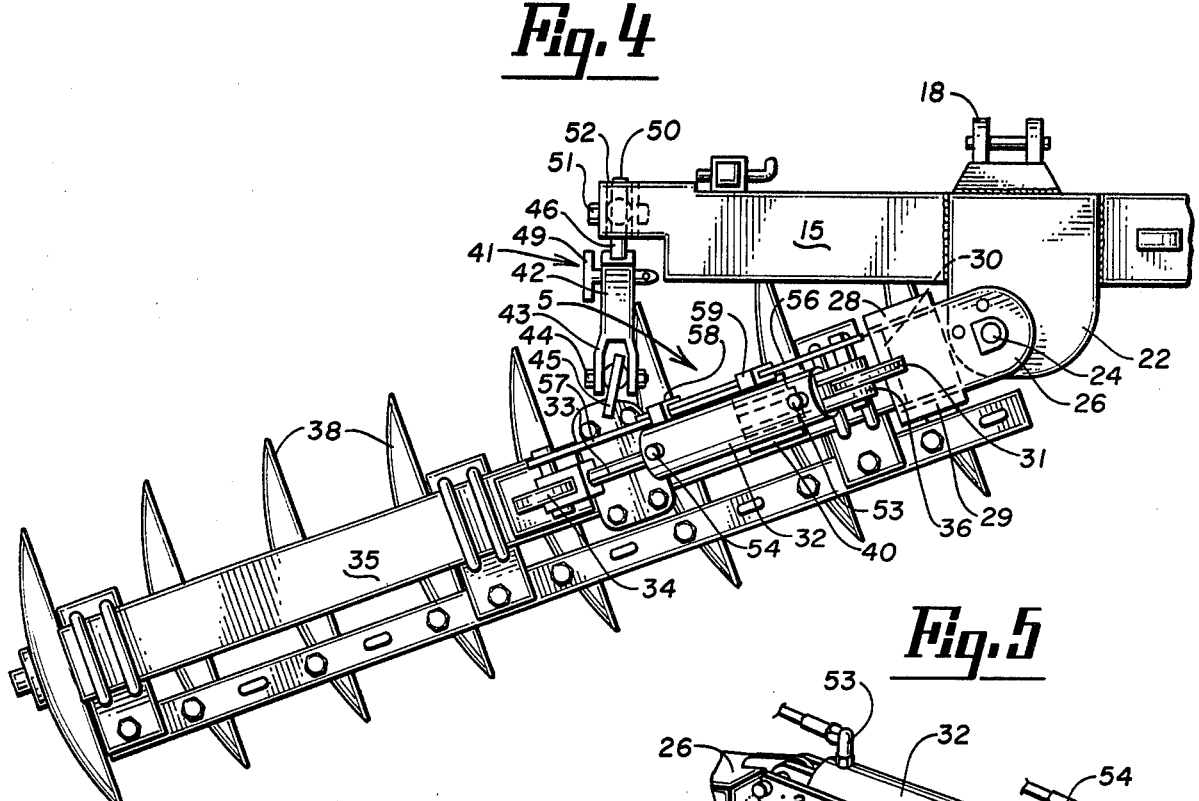
FIG. 4 is a partial plan view of the preferred embodiment of an enlarged scale showing only one of the two disc harrow gangs.

Our terracing plow, as shown in FIGS. 1–12, inclusive, is designed to be drawn behind a tractor 13, as shown in FIG. 1, and to be connected thereto by the conventional three-point hitch 14 thereof. As shown, the plow includes a transverse rigid frame 15, which is provided with a plurality of couplings 16, 17 and 18 by means of which the frame may be connected to the three-point hitch 14 in supported and drawn relation. Pivotally mounted, as hereinafter described, upon the transverse frame 15, is a pair of disc harrow gangs identified generally by the numerals 19 and 20. The individual disc harrows of these gangs are directed inwardly and centrally, as best shown in FIG. 1, so that the soil moved thereby is carried toward a central position along the centerline 21. Each of the gangs 19 and 20, as best shown in FIG. 1, extend rearwardly and laterally outwardly from the point at which it is pivotally connected to the frame 15, which points are located adjacent to the centerline 21 but somewhat outwardly thereof.

Figure 6:
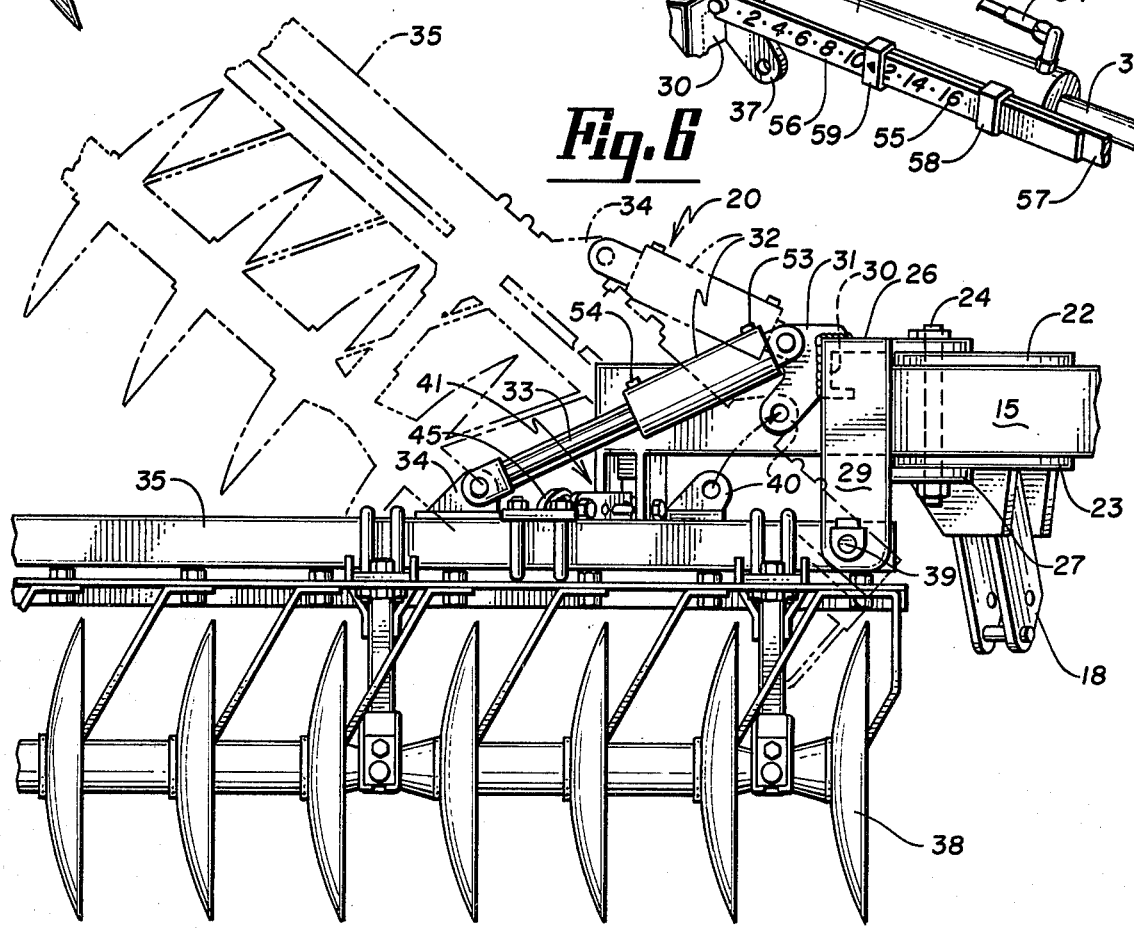
FIG. 6 is a rear elevational view taken along line 6—6 of FIG. 4 with the disc harrow gang shown in elevated position in phantom.

Fixedly mounted upon the transverse frame 15 and extending rearwardly therefrom is a pair of vertically spaced pivot plates 22 and 23. A vertical pivot pin 24 which extends through the outer end portions of said plates 22 and 23 pivotally connects a mounting bracket 25 thereto, as best shown in FIGS. 4 and 6. The mounting bracket 25 includes a pair of vertically spaced mounting plates 26 and 27 which are pivotally mounted on the pivot plates 22 and 23 by the vertical pivot pin 24, as shown in FIG. 6. Fixedly secured to the mounting plates 26 and 27 is a pair of depending pivot supports or ears which are transversely spaced from each other and secured to the outer surfaces of the mounting plates 26 and 27. These support ears are identified by the numerals 28 and 29. An angled strut 30 extends between the two support ears 28 and 29, as shown in FIG. 6, in order to strengthen the same.

Fixedly secured to the mounting bracket 25, as by welding, is a cylinder mount 31 which includes a pair of ears, the upper one of which is utilized to pivotally mount a cylinder 32 having its piston rod 33 extending outwardly and downwardly therefrom and pivotally connected at its lower end to a pivot ear 34 which extends upwardly from the upper surface of the gang frame 35, as best shown in FIG. 6. The upper pivot ear has been identified by the numeral 36 and the lowermore ear is identified by the numeral 37, the latter being utilized to support the gang when in elevated position, as shown in phantom in FIG. 6.

Each of the two gangs 19 and 20 are essentially the same in construction with the exception, of course, that they extend in opposite directions and the discs thereof are arranged so as to move the earth in opposite directions toward the centerline 21. In view thereof, the construction of only one of the two gangs 19 and 20 will be described herein.

As indicated above, each of the gangs includes an elongated frame member 35 from which the individual disc harrows 38 depend. The inner end portion of the frame 35 is pivotally mounted for swinging vertical movement upon the depending support ears, or plates, 28 and 29. A horizontal pivot pin 39 secures the frame 35 between these pivot ears, as shown in FIG. 6. An upstanding support ear 40 is mounted upon the frame 35 in position to register with the opening of the ear 37 when the gang is swung upwardly to an elevated position as a result of the piston rod 33 being withdrawn into the cylinder 32. This is best illustrated in FIG. 6.

An adjustable rigid link indicated generally by the numeral 41 extends between the frame 15 and each of the gangs 19 and 20. The construction of this link can be best seen in FIG. 3. As shown therein, it includes a tubular member 42 which terminates in a yoke 43, having a pin 44 extending through the ends thereof which in turn passes through a pivot socket member 45 carried by the frame 15. The pin 44 has its intermediate portions formed in a ball shape so as to provide, in effect, a universal connection between the tubular member 42 and the frame 15. A cooperative link member 46, which is provided with a plurality of openings 47, arranged to register with the openings 48 of the tubular member 42 is received within the tubular member 42 and is capable of adjustment with respect thereto by removal of the T-pin 49 and shifting the link 46 relative to the tubular member as will be readily understood. The other end of the link 46 is provided with a socket member 50 which receives a pin 51 similar to the pin 44 in that its immediate portion is shaped into a ball to provide an essentially universal connection between the link 46 and the yoke 52 which is carried by the frame 35 of the gang. Thus, it is possible for the gang to be swung vertically while it remains attached to the frame 15 and for the length of the link 41 to be adjusted. When desired, the pin 49 may be withdrawn so as to permit the gang to be swung to a more rearwardly extending position in which it parallels the centerline 21 of the tractor.

Figure 5:
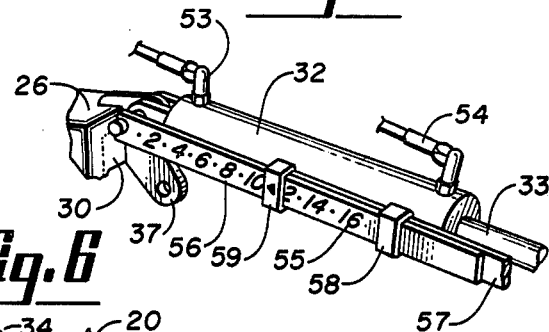
FIG. 5 is a fragmentary perspective of the cylinder and piston assembly extending between the gang mounting bracket and frame of one of the disc harrow gangs.

Associated with each of the cylinders 32 are hydraulic connector lines, such as those indicated by the numerals 53 and 54, by means of which the double action cylinder 32 may be connected to the hydraulic power take-off of the tractor 13 in a conventional manner. Also carried by each of the cylinders 32 are indicia 55 which indicate the extent to which the piston 33 is extended. A link 56 which carries the indicia 55 is pivotally connected to the inner end of the cylinder, as best shown in FIG. 5, and a cooperative link 57 which carries a pair of loop members 58 and 59 extending around the link 56 is connected to the outer end of the piston so as to move therewith and at the same time, slide relative to the link 56. Thus, the extent of extension of the piston 33 is shown by the innermore loop 59 as it registers with the various indicia on the link 56.

From the above, it can be seen that two gangs 19 and 20 can be moved by the cylinder 32 and piston 33 between lowered operative position, as shown in full lines, FIGS. 4 and 6, and elevated position, as shown in FIG. 6, in phantom. Thus, one of the gangs may be utilized while the other is carried in non-operative position. In order to accomplish the elevation to the fullest extent, the T-pin 49 is removed from the link 41 to permit the two sections thereof to separate. The T-pin may then be inserted through the openings in the ears 37 and 40 to hold the gang in elevated position. If desired, while in such elevated position, the two gangs may be swung to a rearwardly extending position paralleling the centerline 21. On the other hand, when the gang is in the lowered opposite position, as shown in FIG. 6, the piston 33 may be extended to force the outer end portions of the gang downwardly into the soil to thereby more effectively move the soil toward the centerline 21 to form the terrace as will be hereinafter described.

In use, a narrow-base terrace may be constructed with our terracing plow in the following manner. The two disc harrow gangs 19 and 20 are lowered to their horizontal positions and the three-point hitch connection of the tractor is lowered sufficiently so that the respective harrows 38 will extend outwardly and downwardly into the soil approximately 4–6 inches. The piston is extended through the indicia position indicated by the numeral 10 of the indicia 55, at which position the frame 35 and the axis of the harrows 38 will be approximately horizontal, or approximate the slope of the surface to be traversed. This is best illustrated in FIG. 7. It will be noted that the individual discs 38 move the soil centrally toward the centerline of the tractor which becomes the centerline of the narrow-base terrace to be formed. The links 41 are extended so that the individual discs 38 cut the soil at approximately 22°–28° with respect to the centerline. One or two passes are made with the two gangs at opposite sides of the centerline 21 in performing this first step of forming the narrow-base terrace. As a consequence, a substantial amount of the soil will move to the central position along the centerline and between the two disc harrow gangs, as shown in FIG. 7.

Depending upon the desired height of the narrow-based terrace, the steps shown in FIG. 8 may, or may not, be included. If a terrace of substantial height is required, the second step is included. This step consists of elevating one of the gangs, as shown in FIG. 8, and securing the same in non-operative position while the other remains in operative position. The tractor is driven parallel to the centerline, but to one side thereof so that the operative gang will engage the soil disposed outwardly of the initial pass of the two gangs, so as to move the soil located outwardly of the initial pass of the gangs laterally inwardly, as shown in FIG. 8. By making repeated passes, as shown in FIG. 9, such outwardly located soil can be progressively moved inwardly into the original central area located between the gangs which is shown in FIG. 1. In performing these passes, for the purposes of moving the more outwardly located soil toward the centerline, the cylinder is extended to the 12 inch position which causes the outer end portions of the gang which is in operative position to be forced downwardly into the soil and thereby more effectively move the soil toward the desired central position. This may require as many as three or four passes along both sides of the centerline, with the path of the tractor during each pass being moved closer toward the original centerline, as illustrated in the drawings. A distinct advantage in so doing is provided in that the wheels of the tractor pack the soil moved during the two initial passes to the centerline along both sides of the centerline, as the tractor wheels move thereover. This substantially reduces the otherwise normal tendency of a terrace to settle after its construction has been completed.

After the outwardly located soil has been moved centrally, as illustrated in FIGS. 8 and 9, both gangs 19 and 20 are lowered, as shown in FIG. 10, and the tractor is driven over the original centerline with the two gangs effectively moving the additional soil centrally along both sides of the centerline 21. It will be noted that in FIGS. 8 and 9, the centerline of the tractor's path is located substantially to the right of the centerline 21 and moves progressively toward the latter. The pistons 33 of the gang shown in FIG. 10 are extended to 12 inches which provides a tilt of the gangs of approximately 4° off horizontal. In other words, the outer end portions of the gangs 19 and 20 are depressed by the cylinders to enhance the earth moving qualities thereof toward the centerline. Repeated passes are made with the assembly along the centerline, as shown in FIGS. 10 and 11, with the cylinders 32 being gradually extended to a further extent. Thus, FIG. 10 illustrates the two cylinders being extended to 13 inches, which provides a tilt of approximately 8° off horizontal. The piston for subsequent passes are extended until, as shown in FIG. 11, they are fully extended to provide a tilt of approximately 18° off horizontal. In this position, the outer end portions of the gangs are forcibly depressed with the result that a much larger amount of soil is moved centrally to the central area between the two gangs and along the centerline 21, as shown in FIG. 11. As a result, the terrace having the configuration shown in FIG. 12 is provided.

FIG. 12 illustrates the contour of the surface after the narrow-base terrace 60 has been formed. If desired, the entire assembly may be passed along the crest of the terrace with the cylinders 32 somewhat retracted so as to somewhat level off the peak and "crown off" the terrace. This will generally help to smooth up the side slopes at the same time.

We have found that by utilizing our terracing plow in the manner hereinbefore described, we can effectively build narrow-base terraces in less time and at a substantially lower expense than has heretofore been possible. As a consequence, a very substantial saving can be accomplished through the use of this equipment and these methods.

It will be appreciated, of course, that in order to raise and lower the gangs 19 and 20 separately, their respective hydraulic power conduits 53 and 54 are connected to separate hydraulic valves which are carried by the tractor and connect the same to the hydraulic power take-off of the tractor 14. Also, the width of each of the gangs is approximately four feet, ten inches and the space therebetween approximates forty-four (44) inches.

In considering this invention, it should be remembered that the present disclosure is illustrative only and the scope of the invention should be determined by the appended claims.

We claim:
1. A narrow-base terracing plow comprising:
 (a) a frame constructed and arranged to be connected to and supported by a tractor to extend transversely thereof;
 (b) a harrow gang having inner and outer end portions and being mounted on said frame adjacent its inner end portion for pivotal movement relative to said frame about a generally horizontal axis extending transversely of said frame and extending laterally outwardly from said axis;
 (c) controllable hydraulic power means pivotally mounted on said frame and extending between and being pivotally connected to said harrow gang at a point located outwardly of said axis;
 (d) said power means being constructed and arranged to controllably move said harrow gang relative to the ground and said frame between lowered operative and elevated non-ground-engaging positions; and
 (e) said power means also being constructed and arranged to force and hold said harrow gang while operative in an off-horizontal position with its outer end portion substantially depressed relative to said axis and to its said inner end portion, and to elevate said harrow gang to its elevated non-ground-engaging position above said frame independently of any other such harrow gangs which may be carried by said frame with its outer end portion substantially elevated relative to its said inner end portion.

2. The structure defined in claim 1 wherein said harrow gang is also mounted on said frame for pivotal movement relative thereto about a vertical axis located adjacent its inner end portion.

3. The structure defined in claim 1 wherein said power means is rigid and longitudinally extensible and upon extension will depress and rigidly hold the outer end portion of said harrow gang at a downwardly inclined position approximating 18° off horizontal.

4. The structure defined in claim 2, wherein said controllable power means includes a hydraulic cylinder, piston and piston rod having a stroke sufficient to elevate the outer end portion of said gang above said frame.

5. The structure defined in claim 2, wherein said controllable power means includes a hydraulic cylinder, piston and piston rod, and indicia associated with said power means and moving therewith for indicating the extent of extension of said piston rod and consequently the extent of deviation of said harrow gang off horizontal.

6. The structure defined in claim 2, and a rigid link pivotally connected for universal movement therebetween at one of its end portions to said frame and at the other end portion to said harrow gang at a point located outwardly of said vertical axis.

7. The structure defined in claim 1, and a second harrow gang having inner and outer end portions and being mounted on said frame adjacent its inner end portion for independent vertical pivotal movement about a generally horizontal axis extending transversely of said frame to a relatively elevated position and extending laterally outwardly from its said axis, said axes being located adjacent each other and each of said harrow gangs extending outwardly and rearwardly therefrom.

8. The structure defined in claim 1,
(f) a mounting bracket pivotally mounted on said frame for pivotal movement about a vertical axis;
(g) said harrow gang being pivotally mounted on said bracket, the said horizontal axis of pivot of said harrow gang extending through said mounting bracket; and
(h) said power means being pivotally mounted at its inner end upon said mounting bracket at an elevation above said horizontal axis of pivot of said harrow gang and being pivotally connected at its opposite and outer end to the medial portions of said harrow gang to elevate same above said frame.

9. The structure defined in claim 8, and
(i) a longitudinally adjustable rigid link extending between said frame and the intermediate portions of said harrow gang and being pivotally connected to each for universal movement therebetween.

10. The structure defined in claim 9 wherein the said pivotal connections of said link with each of said frame and said harrow gang are universal connections.

11. The structure defined in claim 9 wherein said rigid link is connected to said harrow gang at a point intermediate said horizontal axis and the point of connection of said power means to said harrow gang.

12. A narrow-base terracing plow comprising:
(a) a frame constructed and arranged to be connected to and supported by a tractor to extend transversely therebehind;
(b) a pivot bracket mounted on said frame for free pivotal movement about a vertical axis;
(c) a pair of opposed depending support ears carried by said mounting bracket and depending therefrom;
(d) a harrow gang pivotally mounted upon said support ears for movement about a generally horizontal axis and extending outwardly and rearwardly from said horizontal axis;
(e) a rigid link universally mounted at one of its end portions upon said frame and being universally connected at its opposite end portion to the intermediate portions of said harrow gang; and
(f) hydraulic cylinder means pivotally mounted at its inner end upon said mounting bracket and being pivotally connected at its outer end to the intermediate portions of said harrow gang;
(g) said cylinder means being of such length that upon extension it forces and holds the outer end portion of said harrow gang downwardly sufficiently that said harrow gang is off horizontal and inclined downwardly from its said horizontal axis and upon contraction it elevates said harrow gang out of ground-engaging position to elevated position relative to said frame;
(h) said harrow gang being independently vertically movable to elevated non-operative position by said cylinder means; and
(i) said harrow gang including a plurality of discs, the innermost of which is located below and immediately adjacent to the vertical plane of the pivot of said gang.

13. The method of forming a narrow-base terrace consisting in:
(a) moving soil centrally along a centerline of the terrace to be formed, by moving through the soil simultaneously a pair of transversely spaced gangs of centrally-directed disc harrows disposed at opposite sides of the centerline and having outer trailing end portions;
(b) moving the soil disposed outwardly of the prior path of the disc harrows laterally toward the centerline and into that prior path of the harrows, by raising one of the disc gangs so as to substantially eliminate lateral soil movement during operation and moving the other of such harrow gangs parallel to the centerline and through the soil along a path just outwardly of its prior path; and
(c) thereafter moving that laterally moved soil toward the centerline of the terrace until the terrace is formed by repeatedly moving said pair of gangs of disc harrows simultaneously through the soil along opposite sides of the centerline with the outer trailing end portions of the gangs of discs being forced downwardly so that the gangs extend at an angle to the level of the soil being traversed thereby.

14. A method of forming a narrow-base terrace consisting in:
(a) moving a pair of laterally spaced gangs of centrally directed disc harrows along opposite sides of the centerline of the terrace to be formed, with the outer end portions of each gang trailing and the discs thereof cutting the soil at an angle of approximately 21°–29° relative to the centerline to thereby effectively move the soil engaged thereby laterally toward the centerline;
(b) raising one of the disc gangs so as to substantially eliminate lateral soil movement during operation and thereafter moving the other such gang of disc harrows through the soil parallel to the centerline and outwardly of the prior path of the disc harrows, with its outer end portion trailing and depressed off horizontal and its individual discs cutting the soil at an angle of approximately 21°–29° relative to the centerline, to effectively move the more laterally disposed earth toward the centerline and into the first pass path followed by one gang of such harrows;
(c) thereafter moving said other gang of such disc harrows through the soil parallel to the centerline along a line disposed between the line of the immediately preceding movement of the gang of disc harrows and the centerline, to effectively continue the movement of the earth toward the centerline; and (d) then simultaneously moving the two gangs of disc harrows through the soil along the opposite sides of the centerline with the outer end portions thereof trailing and forcibly depressed, with the gangs extending at an angle to the direction through which they are moving through the soil, until the terrace has peaked.

15. The method defined in claim 14 wherein the last mentioned step is repeated with the outer end portions of the gangs being increasingly forcibly depressed until the terrace has peaked.

16. The method defined in either claim 14 or 15, and then moving the two gangs of disc harrows through the soil along the opposite sides of the centerline with the outer end portions of the pair of gang disc harrows being depressed relative to the soil through which they are being moved to a lesser degree than in the immediately preceding pass.

17. The method defined in claim 15 wherein the last mentioned step is repeated until each gang is oriented at approximately 18° off horizontal.

* * * * *